United States Patent [19]

Woodward et al.

[11] 4,142,587

[45] Mar. 6, 1979

[54] ROTARY CULTIVATORS

[75] Inventors: John W. Woodward, Blackburn; Bruce H. Ashton, Elsternwick, both of Australia

[73] Assignee: Massey-Ferguson Services N.V., Curacao, Netherlands Antilles

[21] Appl. No.: 834,091

[22] Filed: Sep. 19, 1977

[30] Foreign Application Priority Data

Sep. 22, 1976 [GB] United Kingdom .............. 39228/76

[51] Int. Cl.² ............................................. A01B 33/02
[52] U.S. Cl. ....................................... 172/47; 172/123; 172/439; 172/449
[58] Field of Search ....................... 172/47, 52, 55, 60, 172/58, 40, 103, 108, 117, 118-124, 439, 449

[56] References Cited

U.S. PATENT DOCUMENTS

| | | | |
|---|---|---|---|
| 2,907,394 | 10/1959 | Cook | 172/449 X |
| 3,183,980 | 5/1965 | Howard et al. | 172/47 |
| 3,193,306 | 7/1965 | Pettit | 172/449 X |
| 3,559,744 | 2/1971 | Olinger | 172/47 |
| 3,905,425 | 9/1975 | Jackson | 172/449 X |

Primary Examiner—Paul E. Shapiro
Attorney, Agent, or Firm—Robert L. Farris

[57] ABSTRACT

Rotary cultivator having resilient vibration damper acting between the cultivator's drive and a reaction member, to absorb vibration generated by varying torque reaction exerted on the drive during use.

18 Claims, 14 Drawing Figures

ROTARY CULTIVATORS

This invention relates to rotary cultivators, that is to say, to earth cultivating implements of the kind having a power-driven rotatable earth-engageable cultivating tool.

A problem that arises during use of rotary cultivators is that when the rotor strikes stones or rocks or even soil which varies in the ease with which it yields to the rotor, vibration and shock loadings are set up in the cultivator and in the drive mechanism for its cultivating tool or rotor. These vibrations shock loadings are undesirable for several reasons, and one of the most notable of which is that they are transmitted to the operator of the cultivator—for example the driver of the tractor, in the case of tractor-mounted rotary cultivators.

An object of the invention is to provide a rotary cultivator having improved means for reducing the transmission of vibration to an operator of the cultivator.

According to the invention there is provided a rotary cultivator comprising:
 a frame;
 a rotatable rultivating tool mounted on the frame;
 a drive to rotate the cultivating tool, the drive being mounted on the frame; and
 a reaction member for connection to draught or control means;
characterized by
 an articulated connection between the drive and the reaction member whereby torque reaction exerted on the drive during use tends to cause relative movement of the drive and the reaction member; and
 resilient means acting between the drive and the reaction member and arranged to resiliently resist said relative movement.

Of course, numerous agricultural cultivating implements have been proposed having pivoted frames and various arrangements of springs and the like for particular purposes. These proposals have in most cases been concerned with allowing the implement to accommodate itself to ground undulations or with cushioning the implement from changes in draught requirement. The present invention is in no way connected with these prior proposals since the arrangements of springs which they disclose are not subjected to torque reaction generated by the drive of a rotary cultivating tool. Furthermore these prior proposals in most cases do not even relate to rotary cultivators but to spring tine type cultivators and the like, in which a completely different set of problems arises.

An embodiment of the invention will now be described by way of example with reference to the accompanying drawings in which.

Figure 1:
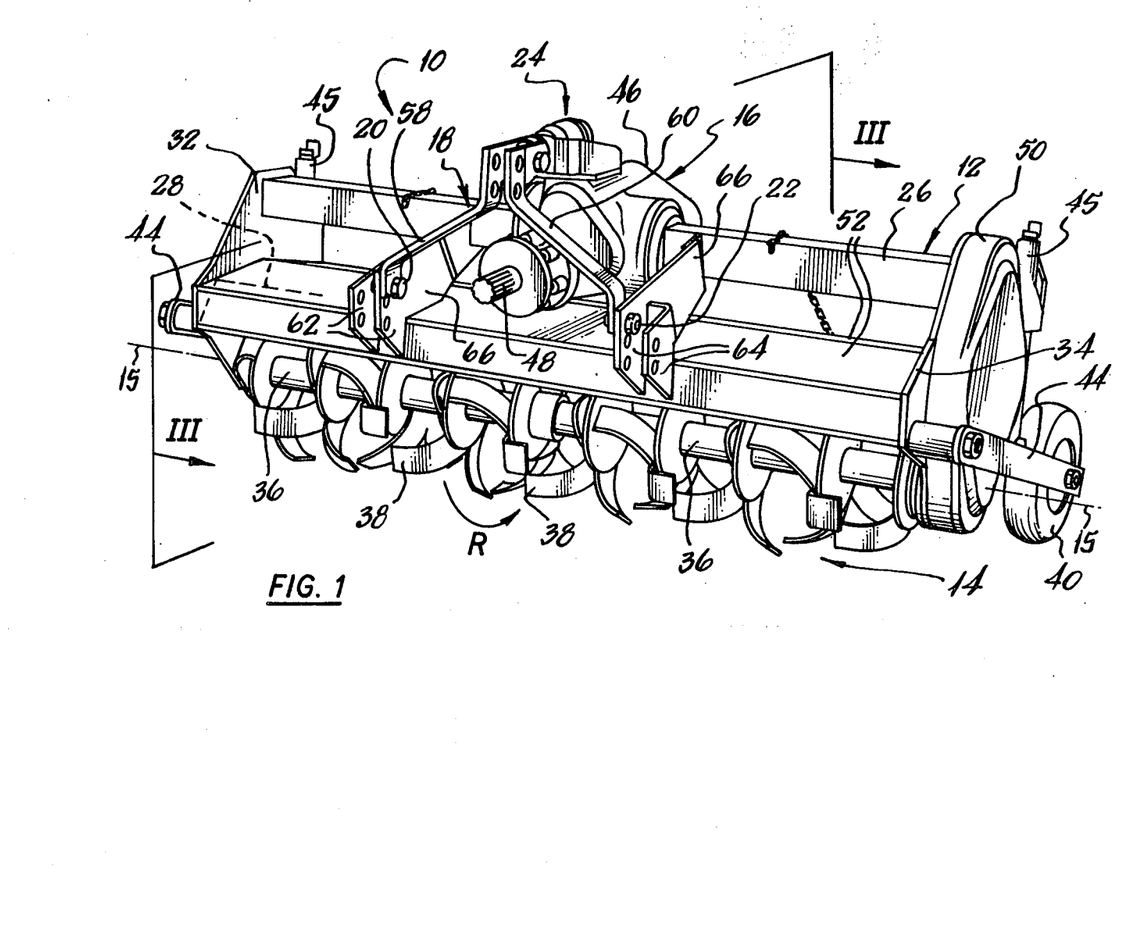
FIG. 1 shows a front perspective view of a rotary cultivator.
Figure 2:
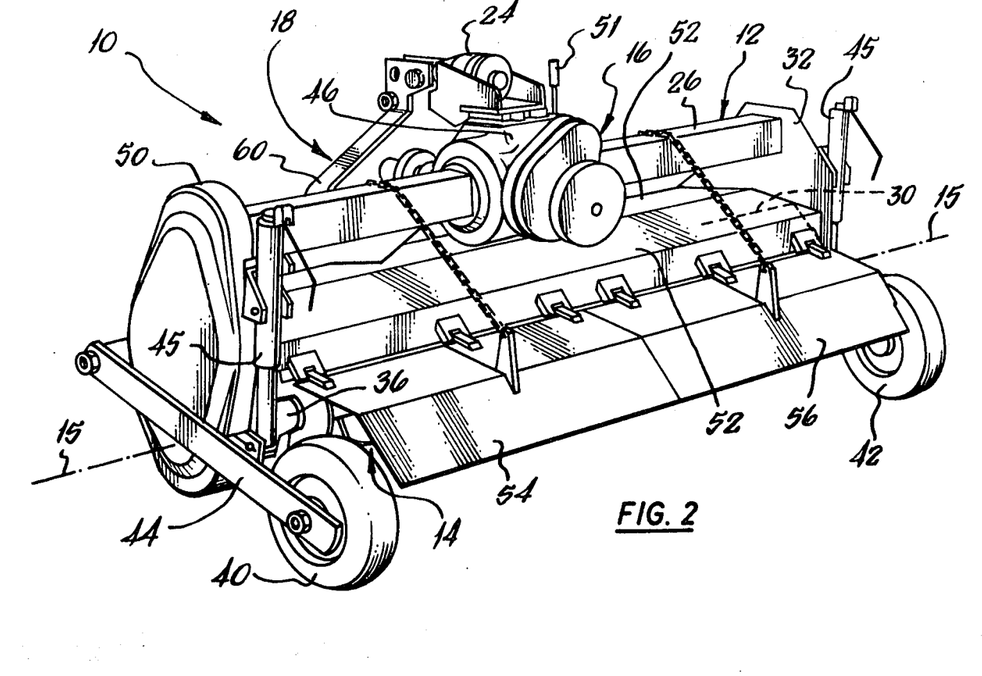
FIG. 2 shows a rear perspective view of the same rotary cultivator.

As shown in FIGS. 1 and 2, a rotary cultivator 10 comprises the following main components:
 a main frame 12 forming the main structural frame of the implement;
 a rotatable cultivating tool or rotor 14 mounted on the main frame 12 for rotation about a horizontal axis 15 extending transverse to the direction of usual forward motion of the implement;
 a drive 16 to rotate rotor 14, the drive being mounted on main frame 12;
 a reaction member 18 in the form of an upstanding mast for connection to the top link of a tractor's 3-point hitch (which constitutes draught and control means for the implement); and
 an articulated connection in the form of a pivotal connection 20, 22 between the lower end of mast 18 and frame 12; and resilient means 24 acting between frame 12 and the upper end of mast 18.

Frame 12 comprises an upper transverse box beam 26 and two spaced lower transverse beams 28, 30, the three beams being parallel and arranged at the corners of a triangle and connected by end plates 32, 34. Beams 28 and 30 are of triangular section.

Rotor 14 comprises a central shaft 36 carrying an assembly of earth-engageable blades 28. Two vertically adjustable depth wheels 40, 42 are journalled on respective arms 44 pivoted on frame 12. A pair of manually adjustable screw jacks 45 set the height of wheels 40, 42.

Drive 16 for rotor 14 comprises a 3-ratio gearbox 46 rigid with frame 12 and having a forwardly-extending splined drive input shaft 48 and a laterally-extending output shaft (not shown) rotatable about its longitudinal axis 49 and extending through upper beam 26 to a final drive transmission housing 50 also rigid with frame 12 through which drive is transmitted to shaft 36 of rotor 14. Gearbox 46 has a ratio change lever 51.

Above rotor 14, an arched spring steel plate 52 extending between beams 28, 30 serves to deflect downwards earth thrown up by the rotor. A pair of pivotally mounted adjustable deflectors 54, 56, at the rear of the implement serve a similar purpose.

Mast 18 is in the form of an A-shaped frame having limbs 58, 60 straddling drive input shaft 48 and connected in the region of their lower ends by pivots 20, 22 respectively to frame 12. Adjacent pivots 20, 22 frame 12 is provided with bifurcated brackets 62, 64 to receive the draught links (not shown) of a tractor 3-point hitch. A pair of fore/aft stiffener plates 66 extend between brackets 62, 64 and upper beam 26.

Resilient means 24 is connected between the upper end of mast 18 and gearbox 46, the gearbox being rigid with frame 12.

Figure 3:
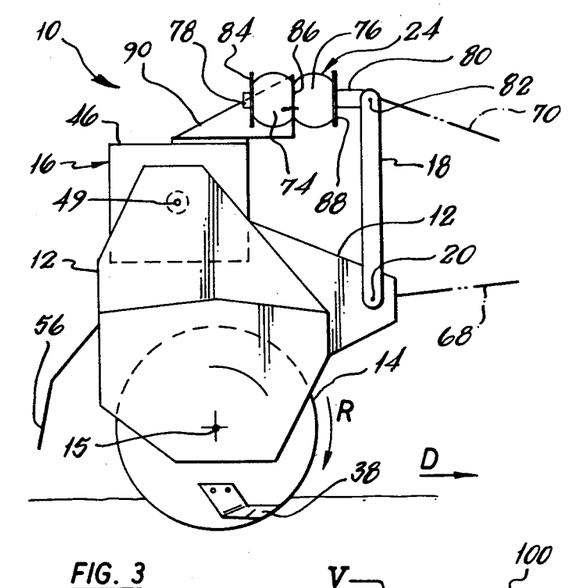
FIG. 3 shows, diagrammatically, a section through the cultivator of FIG. 1 in the plane III—III therein, illustrating the principle of the invention.

In use, rotor 14 rotates in the direction of arrow R i.e. in the direction to tend to move the implement forwards (clockwise rotation about axis 15 as viewed from the left hand end of FIG. 1 and as seen in FIG. 3) whereby frame 12 is subjected to an anti-clockwise torque reaction tending to cause frame 12 to pivot away from mast 18 thereby subjecting resilient means 24 to tension. This can best be understood by reference to FIG. 3.

FIG. 3 is somewhat diagrammatic and indicates the position of the draught links 68 and the top link 70 of a tractor. The structure of resilient means 24 can also be seen in FIG. 3. It comprises a pair of rubber elements 74, 76 through which a bolt 78 extends. The bolt extends into and screw-threadedly engages a bore in a link 80 which is pivotally connected at 82 to mast 18.

Rubber elements 74, 76 are sandwiched between thrust applying plates 84, 86, 88 through which bolt 78 extends. Plate 86 forms part of a bracket 90 fixed to gearbox 46.

During use, the tractor and the cultivator travel in direction D and the torque reaction exerted on gearbox 46 of drive 16 during clockwise rotation (arrow R in FIG. 3) of rotor 14 about axis 15 by the rotor drive 16, has an anticlockwise moment about axis 49 of the gearbox's output shaft. Now at any given time, mast 18 is held in a fixed attitude relative to the ground by the tractor's links 68, 70 and is connected to gearbox 46 at the top by resilient means 24 and at the bottom by pivots 20, 22 and frame 12. The articulated connection between gearbox 46 (forming part of rotor drive 16) and mast 18 provided by pivots 20, 22 is such that the torque reaction exerted on the gearbox during use tends to cause relative pivotal movement of the gearbox and the mast about the axis of pivots 20, 22. However, resilient means 24 resists such relative pivotal movement and thrust is transmitted from plate 86 through rubber element 74 and plate 84 to bolt 78 and link 80. The bolt and the link are thereby put in tension.

The transmission of thrust through rubber element 74 causes it to be compressed. Under theoretical ideal operating conditions where rotor 14 is not subjected to any shock loadings, an equilibrium position is achieved in which the thrust transmitted through rubber element 74 is constant and the degree of compression of the element is constant. Bolt 78 can, if desired, be screwed into link 80 to an extent sufficient to cause pre-compression of the rubber elements 74, 76 so that the average thrust applied to element 74 causes little further compression of it.

When the blades of rotor 14 encounter increased earth resistance, (e.g. a solid obstacle, a hard ridge of earth, or roots etc), the increased torque reaction thereby exerted on gearbox 46 causes an increase in the thrust applied to rubber element 74.

The increased thrust increases the compression of rubber element 74 thus allowing a small increase in the length of resilient means 24 and a corresponding small angular movement of mast 18 relative to gearbox 46 and frame 12, to achieve a new equilibrium position. The natural tendency to overshoot the new equilibrium position is resisted by rubber element 74 itself. Both rubber elements posses inherent damping characteristics since the hysteresis energy loss attendant upon changes in their degree of compression absorbs at least some of the kinetic energy otherwise available to cause such overshooting.

The increased drive input torque required to rotate rotor 14 against the increased earth resistance is reached when resilient means 24 reaches its new equilibrium position. It will therefore be seen that since resilient means 24 takes a finite time to reach its new equilibrium position, the assembly provides a degree of cushioning against changes in earth resistance, by decreasing the rate of change of drive input torque from the very high rate which occurs in the case of a solid drive.

The embodiment of FIGS. 4 to 8 is otherwise similar to that of FIGS. 1 to 3 but incorporates some modifications to the structure and arrangement of the mast 92 (corresponding to mast 18) and the resilient means 94 (corresponding to resilient means 24).

Figure 4:
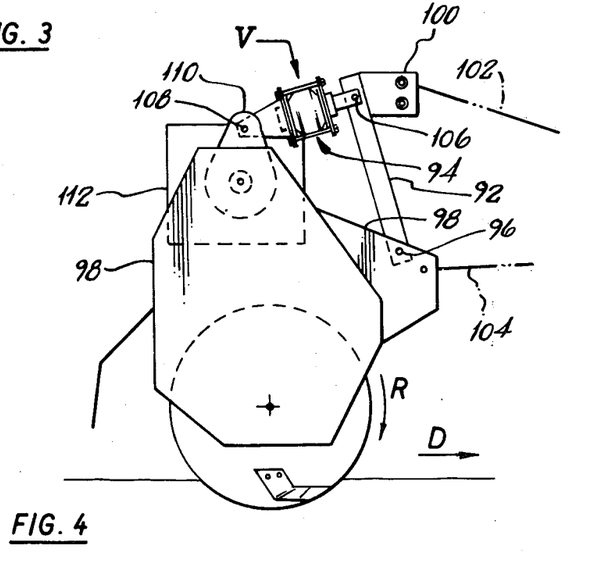
FIG. 4 shows, in a view similar to that of FIG. 3 a second embodiment of the invention.
Figure 5:
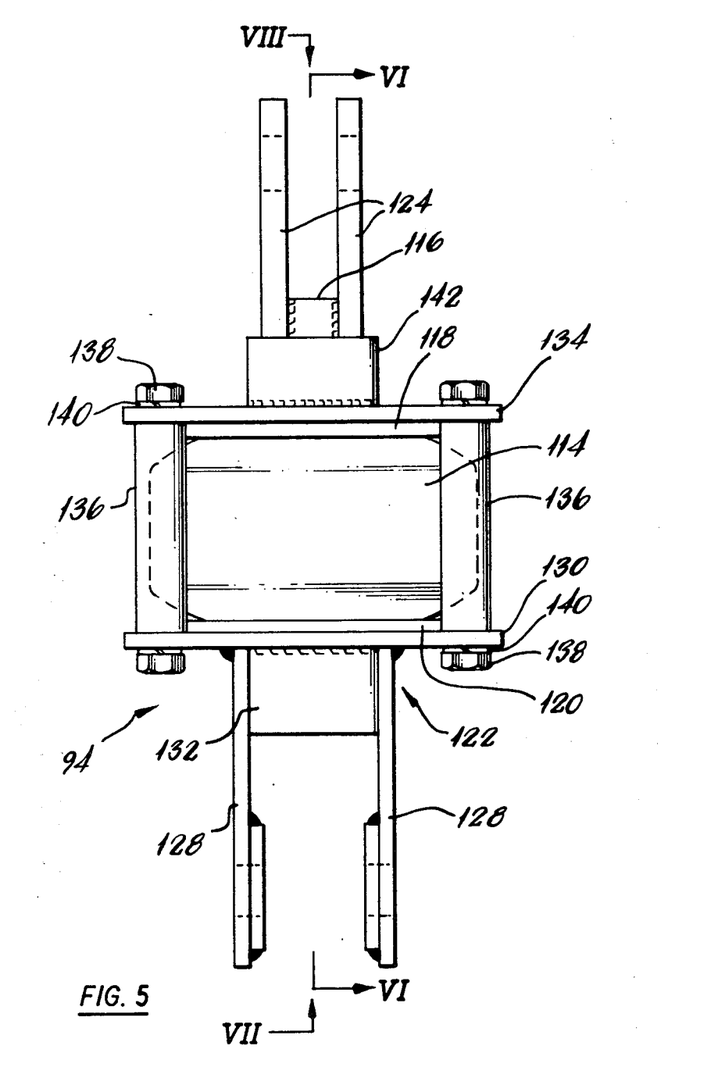
FIG. 5 shows a plan view in the direction indicated by arrow V in FIG. 4 of resilient means forming part of the rotary cultivator.
Figure 6:
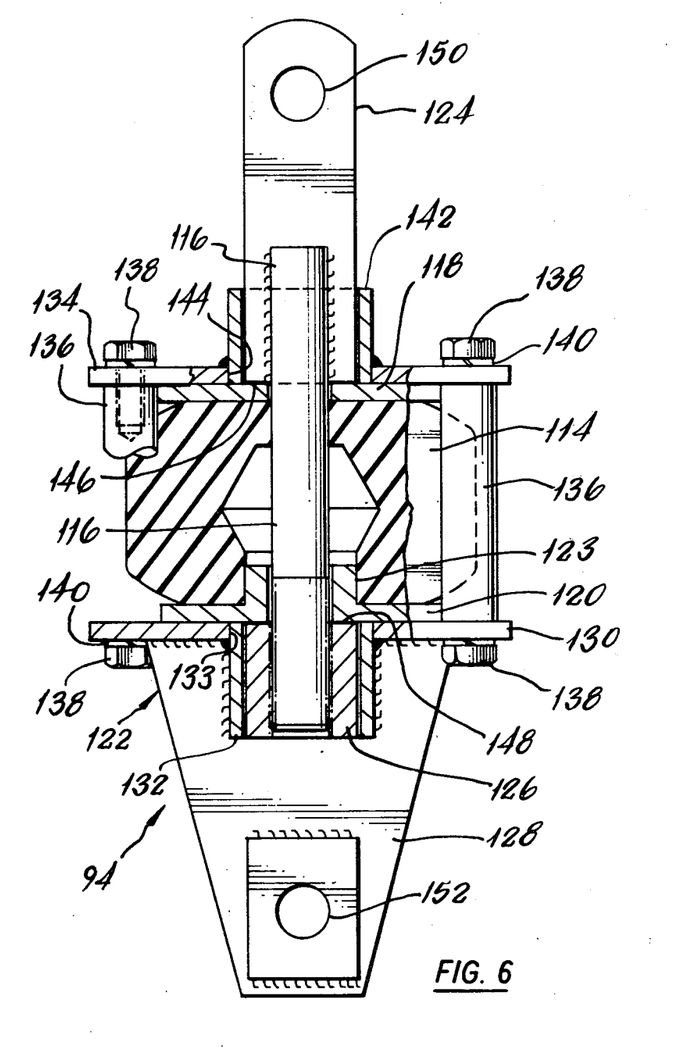
FIG. 6 shows a section through the resilient means of FIG. 5 on the line VI—VI in FIG. 5.
Figure 7:
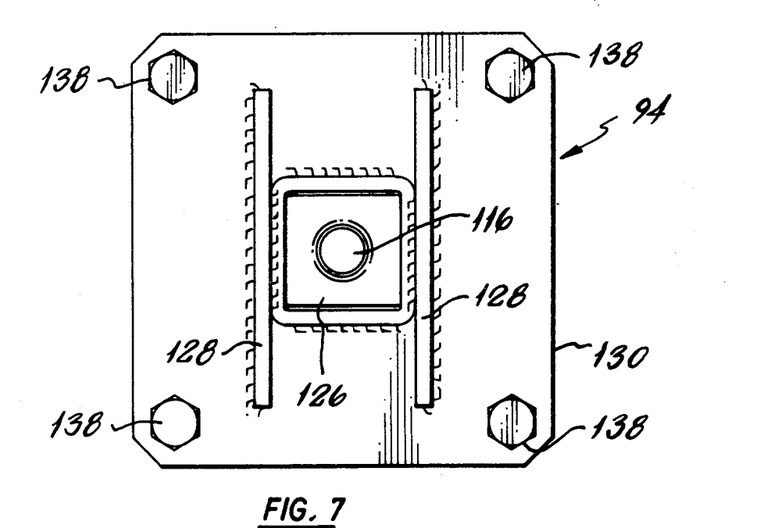
FIGS. 7 and 8 show end views of the resilient means in the directions indicated by arrows VII and VIII respectively in FIG. 5.
Figure 8:
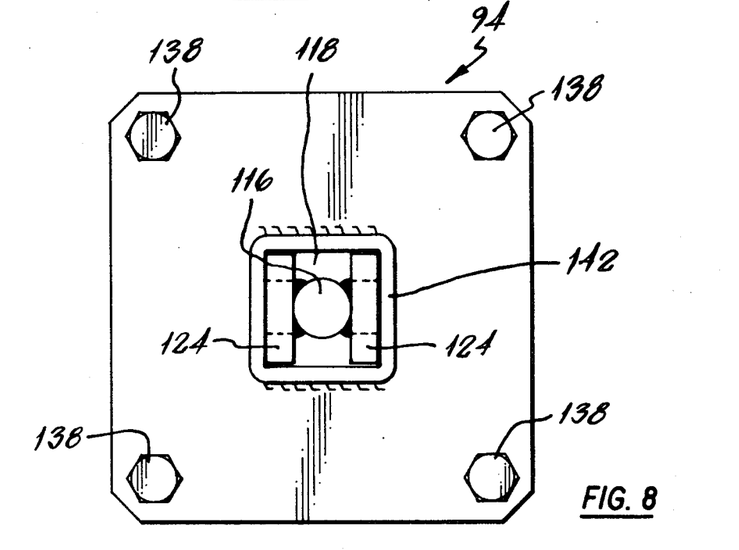

Mast 92 is connected by pivots 96 to the main frame 98 of the implement in a similar manner to mast 18. It has a bracket 100 to receive the top link 102 of a tractor's 3-point hitch and the draught links 104 are connected to the implement as in the previous embodiment.

Two resilient means 94 are provided in parallel, said means being connected by connector pins 106 and 108 at their forward and rearward ends respectively to mast 92 and to bifurcated brackets 110 on the gearbox 112 (corresponding to gearbox 46). Gearbox 112 is rigidly mounted on frame 98.

Each resilient means 94 is constructed so as to be resiliently deformable both when subjected to compression and when subjected to tension i.e. upon relative pivotal movement of gearbox 112 and reaction member or mast 92, in both directions.

As shown in FIGS. 5 to 8, each resilient means 94 comprises a single hollow annular resilient element 114 of rubber, a rod 116 extending through the resilient element, a pair of apertured thrust plates 118, 120 slidably located on the rod, one on each side of resilient element 114, and a caliper 122 embracing the assembly of plates and rubber element. Thrust plate 120 has a collar 123 which fits within resilient element 114.

Rod 116 has welded to it at one end a pair of connector plates 124, and at its other end the rod is formed with a screw thread on which is screwthreaded a square-section adjuster nut 126. Plates 124 and nut 126 constitute spaced abutments on the rod to transmit thrust to the thrust plates 118, 120.

Caliper 122 comprises a pair of wedge-shaped connector plates 128 welded to a first back plate 130. A box-section guide 132 in which nut 126 is a sliding fit is welded to plate 130 in a square section opening 133 therein, between connector plates 128.

First back plate 130 is rigidly secured to a second back plate 134 by four pull rods 136 which are formed with screw threaded drillings at each end to receive bolts 138 having associated spring washers 140. Bolts 138 extend through openings at the four corners of the two backing plates so that pull rods 136 pass across but closely adjacent the surface of resilient element 114.

A box section guide 142 similar to guide 132 is welded to second backing plate 134 in a square section opening 144 therein, and the assembly of connector plates 124 and rod 116 is a sliding fit therein.

The inner ends of connector plates 124 and nut 126 provide abutments 146 and 148 respectively on rod 116, one on each side of resilient element 114 to apply thrust thereto through thrust plates 118 and 120. Nut 126 can by adjusted to allow resilient element 114 to be preloaded as in the previous embodiment.

The outer ends of connector plates 124 and 128 are formed with holes 150, 152 to receive connector pins 106, 108 for connection of the resilient means 94 to mast 92 and brackets 110.

In use, when resilient means 94 is in tension, the "pull" is applied to connector plates 128, to first backing plate 130, and through pull rods 136 to second backing plate 134 which thus applies thrust to thrust plate 118 which is free to slide on rod 116. The other thrust plate 120 is connected through nut 126, rod 116 and connector plates 124 to mast 92—whereby resilient element 114 is compressed between the two thrust plates.

Upon rebound i.e. when resilient element 94 is in compression, thrust is transmitted by backing plate directed to thrust plate 120, and thrust plate 118 is supported by connector plates 124—whereby the resilient element 114 is again compressed.

Figure 9:
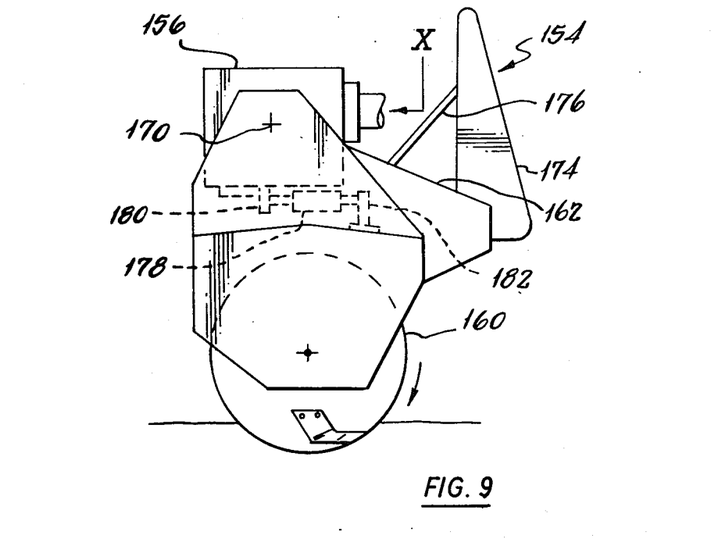
FIGS. 9, 11 and 13 show diagrammatic end elevation views of three rotary cultivators forming three further embodiments of the invention.
Figure 10:
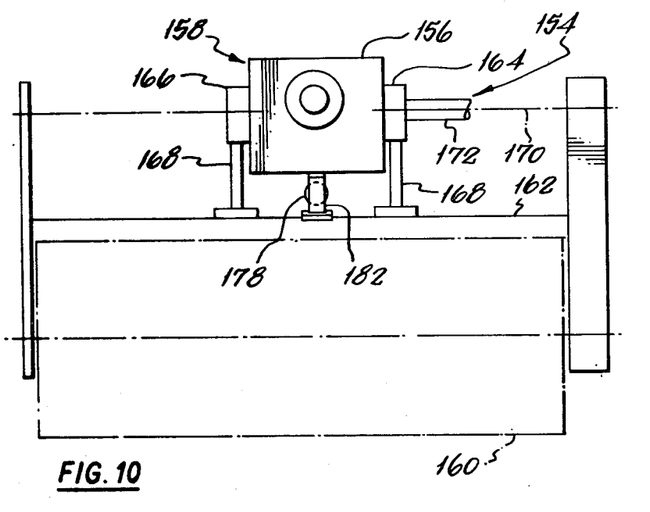
FIGS. 10 and 12 show front elevation views of the cultivators of FIGS. 9 and 11 respectively, the directions of viewing being indicated by arrows X and XII in FIGS. 9 and 11 respectively.

The rotary cultivator 154 of FIGS. 9 and 10 is constructed and arranged as described above in connection with the embodiment of FIGS. 4 to 8 except as detailed below.

The gearbox 156 of the drive 158 for rotor 160 is mounted for articulation relative to the frame 162 of the implement. The gearbox is supported on trunnions 164, 166 mounted on brackets 168 whereby the gearbox can pivot about the axis 170 of its drive output shaft 172.

Mast 174 is rigidly fixed relative to frame 162 by stays 176.

Resilient means 178 (similar to resilient means 94) is connected between brackets 180 and 182 on gearbox 156 and frame 162 whereby the resilient means resists pivotal movement of the gearbox relative to the reaction member (mast 174).

This embodiment operates in substantially the same way as the embodiments described above, with the difference that in this embodiment, gearbox 156 can pivot relative to frame 162 under the action of the varying torque reaction exerted on it during use. Such pivotal movement is resisted by resilient means 178 which therefore provides a measure of cushioning by decreasing the rate of change of drive input torque, as previously. However, in this embodiment only gearbox 156 moves relative to reaction member or mast 174 therefore the inertia of the cushioning mechanism is reduced and it is able to respond more rapidly to changes in the load on rotor 160—thereby providing more effective cushioning.

Figure 11:
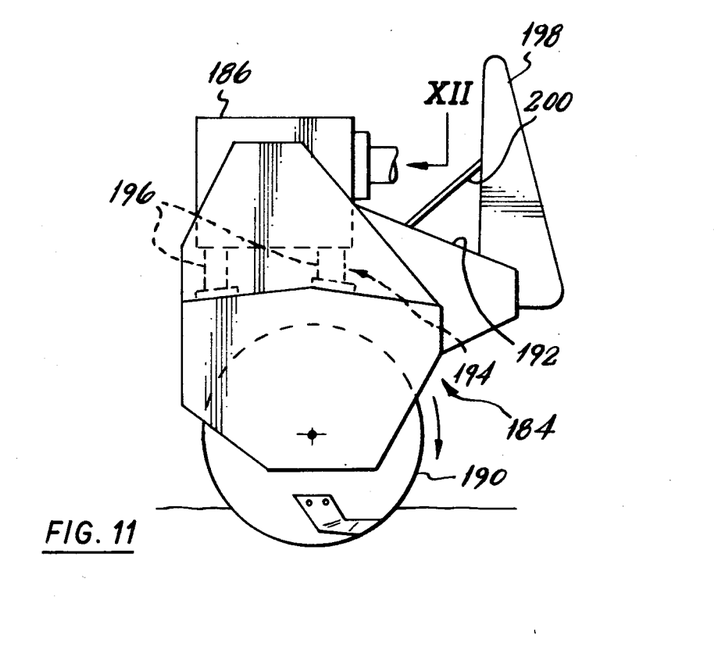
Figure 12:
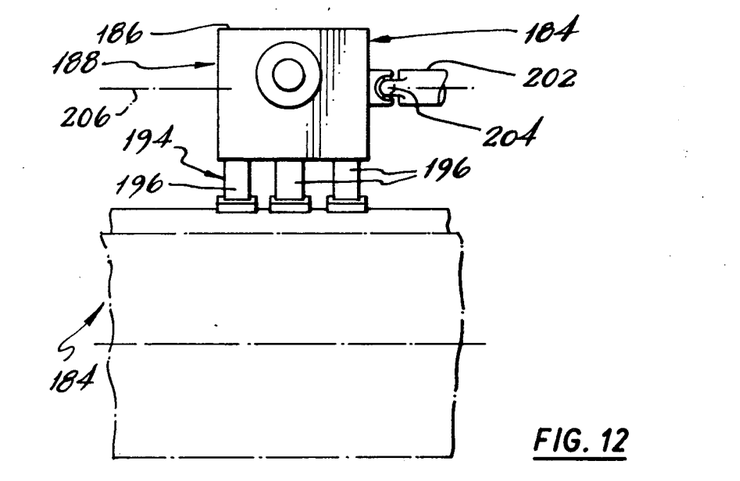

The rotary cultivator 184 of FIGS. 11 and 12 is also constructed and arranged as described above in connection with the embodiment of FIGS. 4 to 8 except as detailed below.

The gearbox 186 of the drive 188 for rotor 190 is mounted on the frame 192 of the implement by resilient mounting means 194 which itself permits articulation of the gearbox relative to the frame. Mounting means 194 comprises six rubber mounting members 196 interconnecting the gearbox and the frame and arranged in front and rear rows of three mounting members.

Mast 198 is rigidly fixed to frame 192 by stays 200, and in this embodiment no resilient means is provided in addition to the gearbox mounting means 194, since the latter itself constitutes resilient means which resiliently resists movement of the gearbox 186 relative to reaction member 198.

The output shaft 202 of gearbox 186 has universal joints 204 at its ends and is telescopically length-adjustable to accommodate movement of the gearbox.

In this embodiment, as in that of FIGS. 9 and 10 the resilient means which resists movement of the drive relative to the reaction member is not connected directly to the reaction member (mast 198) but is connected to the frame. However since the mast is rigid with the frame it will be appreciated that the resilient means nevertheless does indeed resist movement of the drive relative to the reaction member.

The flexibility of mounting members 196 is such that although gearbox 186 can move angularly about any axis and can move bodily in translation in any direction, the mounting members offer least resistance to angular movement of the gearbox about the axis 206 of output shaft 202 and they offer maximum resistance to angular movement about a vertical axis. As regards translational movement, the mounting members offer least resistance to movement of the gearbox in the fore/aft direction and maximum resistance to sideways (or lateral) and vertical movement of the gearbox.

In use, mounting members 196 provide a degree of cushioning in a manner similar to the resilient means 178 in the embodiment of FIGS. 9 and 10.

Figure 13:
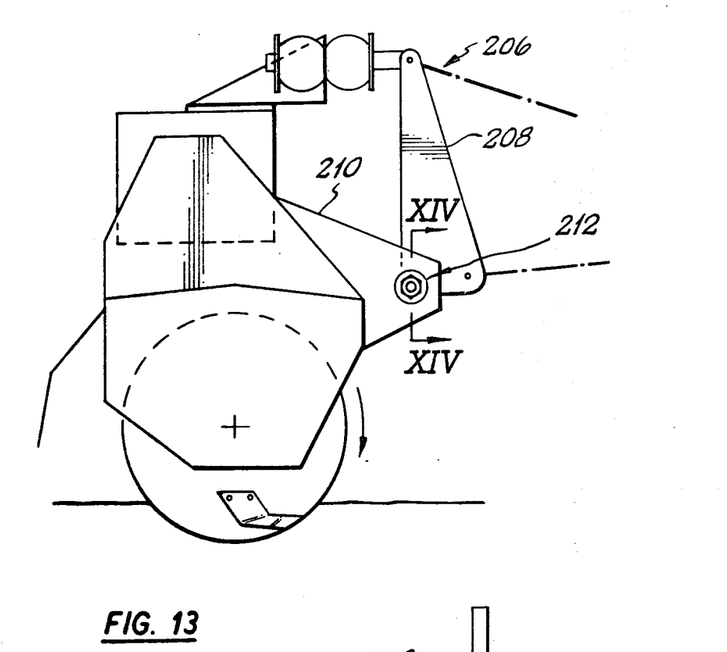
Figure 14:
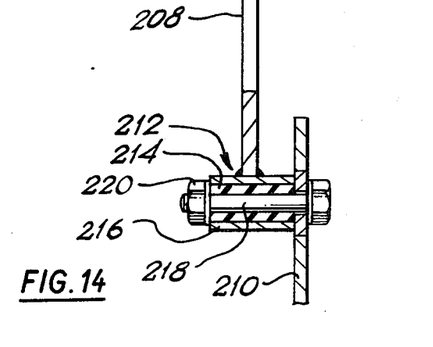
FIG. 14 shows a section on the line XIV—XIV in FIG. 13 through a vibration-absorbing rubber bush.

The rotary cultivator 206 of FIGS. 13 and 14 is otherwise constructed and arranged in the embodiment of FIGS. 1 to 3 with the exeption that the lower end of mast 208 is connected at each side to frame 210 by a resilient bush 212 instead of by a plain bolt.

Bush 212 comprises a rubber sleeve 214 having bonded thereto an outer steel sleeve 216 which is welded to mast 208. A bolt 218 and associated nut 220 secure the assembly together. In use, the bush reduces the tranmission of vibration between the mast and frame 210 thereby providing further cushioning against the transmission of vibration to the tractor hauling the rotary cultivator.

Among the advantages over conventional rotary cultivators provided by the embodiments of the invention described above are an increase in comfort for the operator of the cultivator (the tractor driver) arising from the attenuation and damping of vibration, shocks and other transient forces which are transmitted to the tractor by a conventional rotary cultivator. This also reduces wear and tear on the cultivator itself and on the tractor. In addition, some degree of smoothing of peak transient torque loading on the rotor drive is provided but an effective slip clutch is nevertheless desirable to protect the rotor drive from overload when the rotor encounters a heavy obstruction.

In the embodiment of FIGS. 11 and 12, the resilient mounting of the gearbox permits it to move a little in the fore and aft direction. This enables the gearbox itself to accommodate movement in the fore and aft direction of the whole cultivator arising from changes in the draught load imposed by the cultivator on a tractor's draught-sensing system. As a result, axial loads on the p.t.o. shafts and bearings are reduced.

It is to be noted that in the above embodiments the resilient means acting between the drive and the reaction member is of rubber and therefore provides a degree of damping when relative movement of the drive and the reaction member occurs, by virtue of the energy dissipated as a hysteresis loss in the rubber itself.

Such damping is desirable to avoid cyclic motion of the drive relative to the reaction member. By "damping" is meant, in this context, inelastic absorption of some of the energy required to deform the resilient means.

Alternative methods of providing damping include the use of damping means in addition to the resilient means, the damping means acting between the drive (for example the main cultivator gearbox) and the reaction member. Such damping means may comprise a piston, a cylinder, an orifice and a hydraulic or pneumatic fluid, the piston being slidable within the cylinder to displace fluid through the orifice. A readily available damper of this kind is an automotive shock absorber. Other types of energy absorber or damper which could be used include a rotary shock absorber. These damping devices could be used in combination with resilient means in the form of a helical coil spring.

A further alternative to the use of the rubber resilient means of the embodiments described above is a hydraulic or pneumatic cylinder connected to an accumulator. The accumulator provides the necessary resilience and the system is arranged to have sufficient internal friction to provide the required degree of damping.

Further modifications which could be made in the above embodiments which would nevertheless fall within the scope of the invention are the use of alternatives to the natural or synthetic rubber elements of the above embodiments, as resilient means. Such alternatives include resilient plasics materials, coil springs, leaf springs, pneumatic accumulators, and torsion springs whether of metal or rubber.

Furthermore the invention is not limited to rotary cultivators intended to be fully mounted on the 3-point hitch of a tractor but can be applied to a trailed or semi-trailed implement or indeed even to a walk behind implement. Also, a tined cultivating implement could be mounted between the rotary cultivator and the tractor. Finally, the reaction member need not be an upright structure as in the described and illustrated embodiments but could be a horizontal frame or the like, particularly where the cultivator is semi-mounted or trailed.

In the embodiments described above with reference to the drawings the resilient means is connected directly to the main gearbox of the cultivator. However, this is not the only possible arrangement. The resilient means could be connected to other parts of the drive to the rotor, and in general may be connected to any gear carrier, sprocket carrier or other drive carrier which is subjected to a torque reaction as a result of the torque exerted on the rotatable cultivating tool—and which is permitted to articulate relative to the reaction member. For example the resilient means could be connected to final drive transmission housing 50, or, more generally, to an element of an epicyclic gear train.

We claim:

1. A rotary cultivator comprising:
   a frame;
   a rotatable cultivating tool mounted on the frame;
   a drive to rotate the cultivating tool, the drive being mounted on the frame; and
   a reaction member for connection to draught or control means;
   characterized by
   an articulated connection between the drive and the reaction member whereby torque reaction exerted on the drive during use tends to cause relative movement of the drive and the reaction member; and
   resilient means acting between the drive and the reaction member and arranged to resiliently resist said relative movement.

2. The rotary cultivator of claim 1 characterized in that the drive comprises a gearbox rigidly mounted on the frame and said articulated connection between the drive and the reaction member comprises a pivotal connection between the reaction member and the frame whereby the gearbox and the frame can pivot relative to the reaction member.

3. The rotary cultivator of claim 1 characterized in that the drive comprises a gearbox mounted for articulation relative to the frame.

4. The rotary cultivator of claim 3 characterized in that the gearbox is pivotally mounted on the frame.

5. The rotary cultivator of claim 4 characterized in that said resilient means is connected between the gearbox and the frame, the reaction member being connected to the frame so that the resilient means resists movement of the gearbox relative to the reaction member.

6. The rotary cultivator of claim 3 characterized in that the gearbox is mounted on the frame by resilient mounting means, the resilient mounting means itself permitting articulation of the gearbox relative to the frame, and the reaction member being connected to the frame so that the resilient mounting means itself also provides said resilient means which resiliently resists movement of the gearbox relative to the reaction member.

7. The rotary cultivator of claim 6 characterized in that said resilient mounting means comprises a series of space rubber mounting members interconnecting the gearbox and the frame.

8. The rotary cultivator of claim 1 characterized in that the resilient means comprises at least one rubber element.

9. The rotary cultivator of claim 8 characterized in that the rubber element is sandwiched between thrust applying plates.

10. The rotary cultivator of claim 1 characterized by the provision in addition to said resilient means of damping means acting between the drive and the reaction member and operative to absorb energy inelastically upon articulation of the drive relative to the reaction member.

11. The rotary cultivator of claim 10 characterized in that said damping means comprises a piston, a cylinder, an orifice, and a fluid, the piston being slidable within the cylinder to displace fluid through the orifice.

12. The rotary cultivator of claim 1 characterized in that said resilient means is capable itself of absorbing energy upon articulation of the drive relative to the reaction member.

13. The rotary cultivator of claim 1 characterized in that the resilient means comprises:
   a resilient element;
   a rod extending through the resilient element;
   spaced abutments on the rod, one on each side of the resilient element;
   a pair of apertured plates slidably located on the rod, one between each abutment and the resilient element; and
   a caliper capable of applying thrust to both of said apertured plates in turn.

14. The rotary cultivator of claim 13 characterized in that one of said spaced abutments is in the form of a screw-threaded sleeve or nut which is located on a complementary screw-threaded portion of the rod.

15. The rotary cultivator of claim 1 characterized in that the reaction member is in the form of an upstanding mast for connection to the top link of a tractor 3-point hitch.

16. The rotary cultivator of claim 15 characterized in that said resilient means is connected between the drive and the region of the upper end of the mast.

17. The rotary cultivator of claim 15 characterized in that the lower end of the mast is connected to the frame which connection includes a resilient bush capable of reducing the transmission of vibration between the mast and the frame.

18. A rotary cultivator characterized by:
a frame;
a rotatable cultivating tool mounted on the frame;
a drive to rotate the cultivating tool, the drive being mounted on the frame;
a reaction member for connection to draught or control means;
a pivotal connection between the frame and the reaction member whereby torque reaction exerted on the frame by the drive during use tends to cause relative pivotal movement of the frame and the reaction member in a given direction; and
resilient means connected between the frame and the reaction member and arranged to resiliently resist said relative pivotal movement in said given direction.